(12) United States Patent
Halford

(10) Patent No.: US 9,034,234 B2
(45) Date of Patent: May 19, 2015

(54) ZONE CONTROL OF TOOL TEMPERATURE

(75) Inventor: Ben Halford, Rutland (GB)

(73) Assignee: SURFACE GENERATION LIMITED (GB)

( * ) Notice: Subject to any disclaimer, the term of this patent is extended or adjusted under 35 U.S.C. 154(b) by 387 days.

(21) Appl. No.: 13/502,349

(22) PCT Filed: Oct. 20, 2010

(86) PCT No.: PCT/GB2010/001935
§ 371 (c)(1),
(2), (4) Date: Jul. 14, 2012

(87) PCT Pub. No.: WO2011/048365
PCT Pub. Date: Apr. 28, 2011

(65) Prior Publication Data
US 2012/0267828 A1    Oct. 25, 2012

(30) Foreign Application Priority Data
Oct. 20, 2009 (GB) .................................. 0918362.5

(51) Int. Cl.
*B29C 33/02* (2006.01)
*B29C 35/02* (2006.01)
(Continued)

(52) U.S. Cl.
CPC ........... *B29C 35/0288* (2013.01); *B29C 35/007* (2013.01); *B29C 35/0294* (2013.01); *B29C 2037/90* (2013.01); *B29C 2037/903* (2013.01); *B29C 2037/906* (2013.01); *B29C 33/02* (2013.01); *B29C 33/046* (2013.01); *B29C 33/302* (2013.01); *B29C 33/306* (2013.01)

(58) Field of Classification Search
CPC ...................................................... B29C 35/007
USPC .......................................... 425/143; 264/327
See application file for complete search history.

(56) References Cited

U.S. PATENT DOCUMENTS 3,763,293 A    10/1973    Nussbaum
4,217,325 A     8/1980    Colby
(Continued)

FOREIGN PATENT DOCUMENTS

DE    19854057 A1    11/1998
EP     0122207 A1    10/1984
(Continued)

OTHER PUBLICATIONS

International Search Report and Written Opinion of the International Search Authority of Feb. 8, 2011 in PCT/GB2010/001935.
(Continued)

*Primary Examiner* — Yogendra Gupta
*Assistant Examiner* — Kimberly A Stewart
(74) *Attorney, Agent, or Firm* — Young Law Firm, P.C.

(57) ABSTRACT

A tool system for moulding an article is provided which comprising a tool (100) having a tool surface (104) for forming an article, the tool surface comprising a plurality of tool zones (106). Heating and cooling means (102*a*) are independently associated with at least some of said tool zones (106). A control means is adapted to control the heating and cooling means (102*a*) to individually heat or cool the tool zones (106) having heating and cooling means (102*a*) associated therewith so as to regulate the heat transfer into and out of the article at each tool zone (106) at any particular time throughout the moulding process.

31 Claims, 9 Drawing Sheets

(51) Int. Cl.
  *B29C 33/04* (2006.01)
  *B29C 33/30* (2006.01)
  *B29C 35/00* (2006.01)
  *B29C 37/00* (2006.01)

(56) References Cited

U.S. PATENT DOCUMENTS

| | | | |
|---|---|---|---|
| 4,251,253 A * | 2/1981 | Becker et al. | 65/267 |
| 5,738,345 A | 4/1998 | Schroeder et al. | |
| 6,089,061 A | 7/2000 | Haas et al. | |
| 2003/0154004 A1 * | 8/2003 | Kroeger et al. | 700/272 |
| 2004/0245428 A1 | 12/2004 | Moshe | |
| 2006/0051451 A1 | 3/2006 | Hutchinson | |
| 2009/0229748 A1 | 9/2009 | Bertold | |

FOREIGN PATENT DOCUMENTS

| | | |
|---|---|---|
| GB | 1234367 A | 9/1969 |
| GB | 1480647 A | 7/1977 |
| GB | 2216456 A | 10/1989 |
| JP | 29002807 A | 1/1984 |
| WO | 96/35563 A1 | 5/1996 |
| WO | 2005/049298 A1 | 11/2004 |
| WO | 2006/067447 A1 | 12/2005 |

OTHER PUBLICATIONS

GB Patent Office Search Report of Mar. 4, 2010 in Application No. GB0918362.5.

* cited by examiner

ZONE CONTROL OF TOOL TEMPERATURE

BACKGROUND

This invention related to a heated tooling system, in particular to a heated tooling system for increased control of material properties of an article made in said tooling system.

Many materials are moulded using a variety of moulding tools. It is well known in some industries, for example in the metal casting industry, that the rate and temperature at which a material solidifies affects the material properties of the article. This effect usually takes place on a microscopic scale and may for example include such characteristics as the proportion of amorphosity or crystallinity in the final product. When materials such as metals are used, the article can be treated after it comes off the tool or mould, for example by heat treating and quenching, to control the material properties, however these processes are lengthy and increase production time and cost.

When polymer materials are moulded, in particular thermosetting resins, which may also contain a filler, the finished article can not usually be treated by a secondary process to control its structural properties after it comes off the tool. Some tools may be maintained in a temperature controlled environment, for example an autoclave, to regulate the overall tool surface temperature and this can be effective for articles with a relatively thin and constant cross sectional area.

When using tools to produce articles that have a thick or, in particular, a variable thickness the problems associated with variance in material properties of the finished product are further compounded by variance in heat loss from the different thickness sections.

When thermosetting resins are used further complications arise by virtue of the exothermic nature of the process of curing/cross linking. The temperature of the curing thermoset polymer is a product of not only the tool temperature, but also of the local reaction rate and the ability for heat to escape from the area in which the reaction is occurring. The result of this is that the thermosetting polymer will cure at different rates at different points across its profile resulting in different material properties derived from the differing molecular structure.

Metals and thermoplastic polymers will experience different crystallinities in areas of different thickness as the cooling rate will vary dependant on heat extraction. Autoclaves can be used to control this but, in order to overcome the differences due to different cooling speeds of thick and thin parts of an article generally very gradual cooling is used which increases production time. Furthermore autoclaves are notoriously energy inefficient and require large areas to accommodate their footprint which is typically much larger then the actual tool for the article.

Even though the different material properties arising from current tooling systems may, to some extent, be predictable it is not controllable. In many instances, the design of articles, in particular those to be moulded out of thermosetting polymers, is compromised between an ideal design and a design that is practical to process. In particular where an ideal solution for a part would comprise a single large article having sections of different thickness, several smaller articles, each having a more uniform thickness, may be manufactured and assembled together so as to obtain better control over the material properties of each section of the article.

A further problem with current moulding techniques, and particularly associated with autoclaves is that they are not controllable so as to vary the material properties of the articles they produce. For example if a thermoplastic, e.g. PEEK, part of varying thickness were required that had thicker sections required to have a high crystallinity to impart strength and thinner sections having a lower crystallinity to impart flexibility, then current technologies are not effective in creating such a part in a single moulding process. The present invention at least partially mitigates the above mentioned problems with known tooling processes.

SUMMARY

According to a first aspect of the invention there is provided a tool system for moulding an article, the system comprising: a tool having a tool surface for forming the article, the tool surface comprising a plurality of tool zones, heating and cooling means independently associated with at least some of said tool zones; and control means adapted to control the heating and cooling means to heat or cool the tool zones having heating and cooling means associated therewith to regulate the heat transfer into and out of the article at each tool zone at any particular time throughout the moulding process by individually heating or cooling the tool zones.

By continuously being able to locally heat and/or cool the tool zones and thereby control the heat transfer into and out of the article within the tool the material properties of the finished article can be controlled during the moulding process.

In a preferred embodiment the tool system further comprises a plurality of sensors to sense a property of the article within the tool zones and producing signals indicative of said property.

The control system has an input means that receives said signal indicative of said property and the control system controls the heating and cooling means in response to said signal to heat or cool said tool zones. The sensed property may be one of: temperature, dielectric constant, strain, ultrasonic penetration and hardness or any other suitable parameter that can be used to indicate the cure rate of the polymer. In this manner the material property can be controlled with direct feedback throughout the moulding process. The sensor may measure the property indirectly, for example by measuring temperature, the sensed temperature being indicative of a material property, e.g. crystallinity which develops at different rates dependant on temperature, or may measure the property more directly using such means a dielectric constant which is proportional to, for example, crystallinity. By controlling the heating and/or cooling dependant on these properties allows a finished article with known properties to be moulded and the independent control of these properties within different zones of the tool enable a article to be moulded having required different material properties repeatably produced to a specification in different areas of the article.

An example of such a product may be a nose cone moulding for a racing car. The sides of the cone will be required to be thin and highly rigid so as to control the airflow thereover with minimal reinforcement and will therefore require a high level of crystallinity in the material structure. The nose of the cone however will be required to be less brittle and be able to be struck by small objects, for example stone chips thrown up by another car, without shattering. The nose part of the cone will therefore require more amorphisity and therefore be less brittle and more able to withstand such an impact.

According to an embodiment of the invention some tooling pins have heating means associated therewith and other tooling pins have cooling means associated therewith.

In one arrangement each heated/cooled tool zone may have an independent in-line heater/cooler associated therewith, which may comprise an internal channel in each tool zone below the tools surface through which a heating/cooling fluid is passed. The system may also comprise at least one reservoir for a heating and/or cooling fluid.

Preferably the system further comprises a plurality of fluid flow paths to direct flow of said heating/cooling fluid from said reservoir to individual tool pins. Each flow path has an in-line heater therein for heating fluid passing therethrough.

The tool system may comprising return fluid flow paths to return said heating/cooling fluid from said tool pins to said reservoir and may comprise a plurality of said reservoirs, each reservoir containing heating/cooling fluid which may be maintained at a different temperature. In this manner a single heater/cooler may be associated with each reservoir rather than with each heated/cooled tool pin, there by reducing the number of heaters/coolers needed. The cooled tool pins may be cooled by ambient temperature air and therefore may not need physical apparatus to cool the cooling fluid. Where ambient air is used for cooling purposes it would not be recycled back to the reservoir but would be vented to atmosphere.

In one preferred arrangement a constant flow of fluid passes through the tool zones and wherein activation of the inline heater changes the fluid from a cooling fluid to a heating fluid.

In a preferred arrangement the tool system comprises a plurality of active tool zones having heating and cooling means associated therewith, and a plurality of passive tool zones containing no heating and cooling means associated therewith, the passive tool zones adjacent to and/or interspaced with the active tool zones.

In an alternative embodiment the tool system comprises a plurality of heated tool zones and a plurality of cooled tool zones, the cooled tool zones being interspaced between the heated tool zones. In this manner tool zones that are not directly heated/cooled (the passive tool zones) are indirectly heated/cooled by heat transfer with adjacent directly heated/cooled tool zones.

The heated zones, cooled zones or the passive zones may have sensors associated therewith which form part of the control circuitry. In particular sensors on the passive zones allow the temperature transfer into the article in these zones to be closely monitored and controlled through heat transfer with adjacent heated zones. In a preferred embodiment the tooling system comprises a plurality of tool pins that tessellate to form the tool surface and wherein at least some of the tool pins have fluid channels therein through which heating/cooling fluid passes. The heated tool pins may have an internal in-line fluid heater for heating fluid passing through the tool pin. In one arrangement the tool pins through which heating/cooling fluid passes contain an insert that defines at least part of the fluid flow path. The insert may be removable/interchangeable and different fluid flow paths in the insert will increase or decrease the residency time of the fluid passing therethrough and/or alter the distance between the heating/cooling fluid and the tool surface. In this way the heat transfer into the tool surface can be changed. Furthermore, common pins can be used and different inserts inserted to change the heat transfer for different tool zones In one arrangement the tooling system further comprises a plurality of normally open control valves for controlling the flow of the heating/cooling fluid to the tool zones. In this way if there is a failure in the system the valves will fail open and unheated fluid will flow therethrough to reduce the tool temperature. The valves may be variable flow control valves or maybe bi-state or tri-state valves. The system according may comprise a sensor or sensors for sensing a material property of said article material and supplying a signal indicative of said property to said controller prior to commencement of the moulding process, the controller adapted to modify the control of said heating and cooling means in response to said sensed material property. In this manner, prior to commencement of, or during, a moulding process parameters of the control of the process can be modified to take into consideration batch variance of the article material.

In a preferred embodiment the tooling system further comprising a second tool arranged substantially opposite the first tool which may be substantially the same as the first tool.

According to a second embodiment of the invention there is provided a method of manufacturing an article comprising: placing a material to be moulded in a tool having a tool surface for forming the article, the tool surface comprising a plurality of tool zones; activating heating and cooling means associated with at least some of said tool zones so as to locally vary the tool surface temperature of each tool zone; and actively controlling the heating and cooling means to regulate the heat transfer into and out of the article at each tool zone at any particular time throughout the moulding process.

The method may further comprise, sensing at least one property of the article at each tool zone and producing signals indicative of said property at each tool zone.

The method according may include said control system has receiving the signals indicative of said property and controlling the heating and cooling means in response to said signal to heat or cool said tool zones. Sensors, which may be temperature sensors, dielectric sensors, strain gauges, piezo sensors, ultrasonic sensors or hardness sensors sense the material property.

The method preferably further comprises moulding a sacrificial piece of article material in a sensing section and wherein said piece of article material in said sensing section has sensors embedded therein. Several sensors may be embedded within said sacrificial piece of article material at locations having different article material cross sectional areas and controlling the heating and cooling means of tool zones at a particular mould cross sectional areas in response to the signals generated by sensors at a corresponding cross sectional area. In this manner sensors may be embedded within a piece of the article material to sense a material property, as it develops during the moulding process, in the middle of a moulding. The sensors may be embedded in cross sections of different area to enable an accurate signal of the changes in material property occurring within the moulding itself without needing to place sensors in the article. Of course, in some applications it may be possible to place the sensors in the article and leave them embedded therein when the article is removed from the tool.

A method preferably comprises regulating the heat transfer into and out of the article to produce, within a predetermined tolerance, specific material properties in the finished article. Preferably the specific article material properties are individually controlled within specific tool zones. The specific material property may be one of: density crystallinity/amorphisity, crystal size, cross-link ratio and vulcanisation.

In one embodiment the method comprise sensing a material property of said article material prior to commencement of the moulding process and supplying a signal indicative of said property to said controller prior to commencement of the moulding process, the controller modifies the control of said heating and cooling means during the moulding process in response to said material property sensed prior to commencement of the moulding process. In this manner the control can be modified to take into consideration differences material properties between batches of material. In another embodiment the article is manufactured by resin transfer moulding and the tool zones are sequentially heated from the point of resin injection in the direction of resin flow so as to elevate the mould temperature as the leading edge of the resin flow passes there over thereby reducing the viscosity of the resin at the resin/perform interface as it flows into the tool. The tool zones can be heated prior to the leading edge of the resin flow arriving there in a manner that when the resin passes the tool zone the tool surface temperature has already peaked and is starting to cool.

The tool zones may be user defined or may be automatically defined by the system. In one embodiment the controller of the system monitors the performance of the tool zones and if it is not possible for the controller to heat the tool zones to the required temperatures then it may redefine the tool zones. If for example the performance of one heater was to reduce due to malfunction, the tool zones could be redefined to include another heater within the same tool zone as the underperforming heater. Where multiple heaters are used they are preferably split between different phases of a three phase electric supply. Furthermore the controller controls the use of the heaters to ensure that a situation does not occur when a significantly unbalanced power draw is placed on any one single phase of the electricity. This may, for example include using heaters when they are not strictly needed. For example when a zone is desired to be cooled the heater associated with it could be periodically pulsed to place a small load on its electricity phase. As the fluid flow will still be below the temperature of the tool cooling will still occur albeit at a slower rate on account of the slightly increased temperature due to the pulsing of the heater. Such methods can assist in balancing the electricity supply used in the invention.

To assist in the balancing of the current the tooling system may be provided with two different levels of cooling, for example by switching between a high coolant flow and a low coolant flow. The high coolant flow could be used when extreme cooling is needed or could be used in combination with the use of the heaters as described above to effect cooling when the heaters are powered or partially powered without loosing cooling power compared to the lower normal coolant flow rate.

BRIEF DESCRIPTION OF THE DRAWINGS

Specific embodiments of the invention will now be described, by way of example, with reference to the following drawings in which.

DETAILED DESCRIPTION

Figure 1:
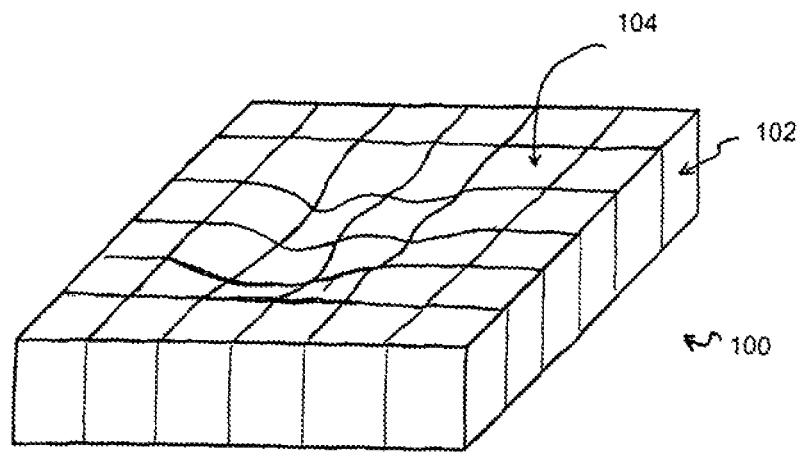
FIGS. 1 and 2 shows a tool of a tool system according to the first aspect of the invention.
Figure 2:
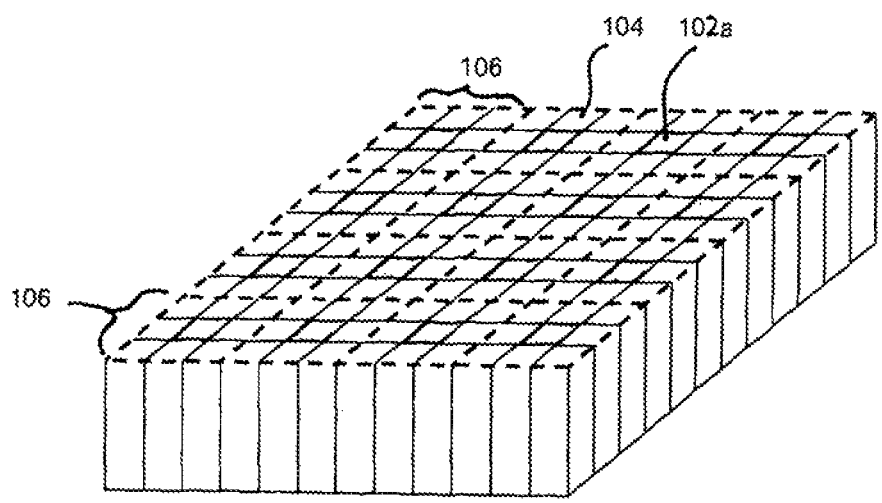

Referring to FIGS. 1 and 2 a tool 100 is shown comprising a plurality of tool pins 102 each having a surface 104 on a tool face which may be flat or which may have a contoured surface. The tool surface is divided into a plurality of tool zones 106, each zone comprising one or more tool pins. In the example shown in FIG. 2 each zone 106 is a 3×3 array of tool pins 102. The tool surface 104 of FIG. 2 is shown as being flat for illustration purposes only and would, in use, have a contoured/shaped tool surface. Each tool zone 106 has at least one heated/cooled pin 102*a* (see FIG. 3) associated therewith. The heated/cooled pin may be a single pin or where, each tool zone 106 comprises more than one tool pin 102, separate heated and cooled pins can be used. By controlling the application of heat and cooling to the tool zones 106 the transfer of energy into and out of an article being made in the tool 100 can be locally controlled at specific times during, the moulding process. As is well documented the temperature and speed at which materials solidify effects various material properties, for example, amorphisity, crystallinity, hardness, impact resistance etc. Therefore, by carefully controlling the flow of heat into and out of an article during the moulding process the material properties of the finished article can be controlled. In some instances control may be required to ensure that an article has constant material properties and in other instances it may be desirable to create an article out of a single material having different properties in different areas of the article. The number of tool pins 102 in a tool zone 106 will depend on the finesse of control needed. Where great control of localised temperature is needed each tool zone 106 may comprise a single heated/cooled pin 102*a*. In an alternative arrangement, not shown, the tool may comprise a number of actively heated and cooled tool zones having heated/cooled pins 102*a* therein and a plurality of passively heated/cooled tool zones that are heated/cooled by heat transfer with adjacent actively heated/cooled tool zones.

For a given tool the heat zones may be defined by the user when designing the tool or may, for example, be automatically assigned by the controller. The Controller may redefine the zones during the moulding process. This could, for example as a result of the moulding process, or could be due to the mould not achieving the temperatures desired from the controller. In the first instance if, during for example a resin transfer moulding process, resin is injected from one end of the mould then it may be desirous to heat the tool progressively in bands starting at the point of entry to ensure that as the leading edge of the resin being injected is wetting and impregnating the perform material, it is heated to reduce its viscosity enabling it to flow better. Once the material is fully injected the zones may be redefined for example to give different areas of the part different materials properties. Alternatively, if for example one of the heaters broke and was unable to provide heating to one zone, that zone may be split and attached to the adjacent zones so as to maintain control (albeit possibly to a lesser degree of finesse) of the tool surface temperature in that zone.

Figure 3:
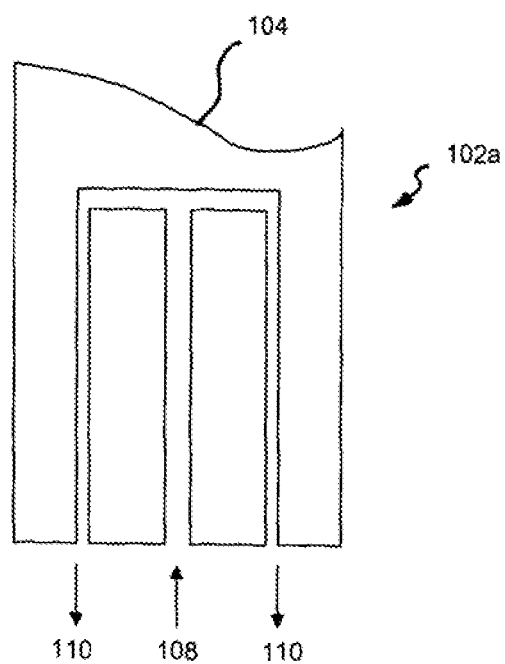
FIG. 3 shows a section through a tool pin for use in the tool system.

In use the tool pins would be surrounded by a bolster which is not shown. The bolster securely clamps all the pins together. The bolster may also be heated to the same temperature as the pins adjacent it such that as the pins expand and contract with the heating and cooling, so too does the bolster. The entire bolster may be heated and cooled, or alternatively, just the corners of the bolster may be heated/cooled. Referring to FIG. 3 an example of a heated/cooled pin 102*a* is shown. The tool pin has a contoured surface 104 for, in use, forming an article. The tool pin 102*a* has an inlet 108 for supplying cooling/heating fluid to the pin 102*a* and an outlet 110 for removing used heating/cooling fluid from the pin 102*a*.

Figure 11:
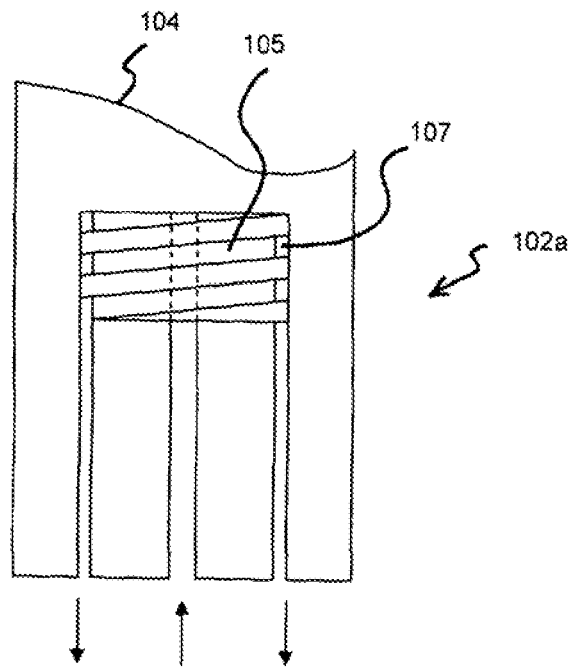
FIGS. 11 and 12 show cross sections through tool pins used in the tool system of the invention.

FIG. 11 shows a variation of the tool pin 102b of FIG. 3. In this embodiment a heat exchange insert 105 is placed in the pin adjacent the end of the pin forming the tool surface 104. The insert has a fluid flow path 107 (in this case in the form of a helix around its outer edge, to increase the residence time of the heated fluid in the area of the pin adjacent the tool surface to enable more heat to be extracted from the fluid. This increased flow path length enables improved heat transfer. Different inserts 105 with different flow paths can be used in the pins to manage the heat transfer at different pins. This enables the pins 102a to be standardised and the overall tool system to then be customised to obtain the required heat transfer characteristics in the correct areas of the tool.

Figure 12:
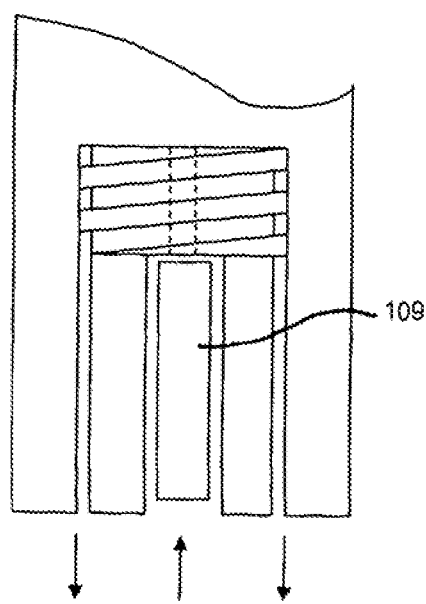

FIG. 12 shows a further embodiment of the tool pin wherein the tool pins are provided with an internal heater 109 that heats the fluid as it passes into the tool pin and as it approached the tool surface. The heater may be used with the tool pin of FIG. 11 or may be used with the tool pin of FIG. 3, i.e. with or without the insert 105.

Figure 4:
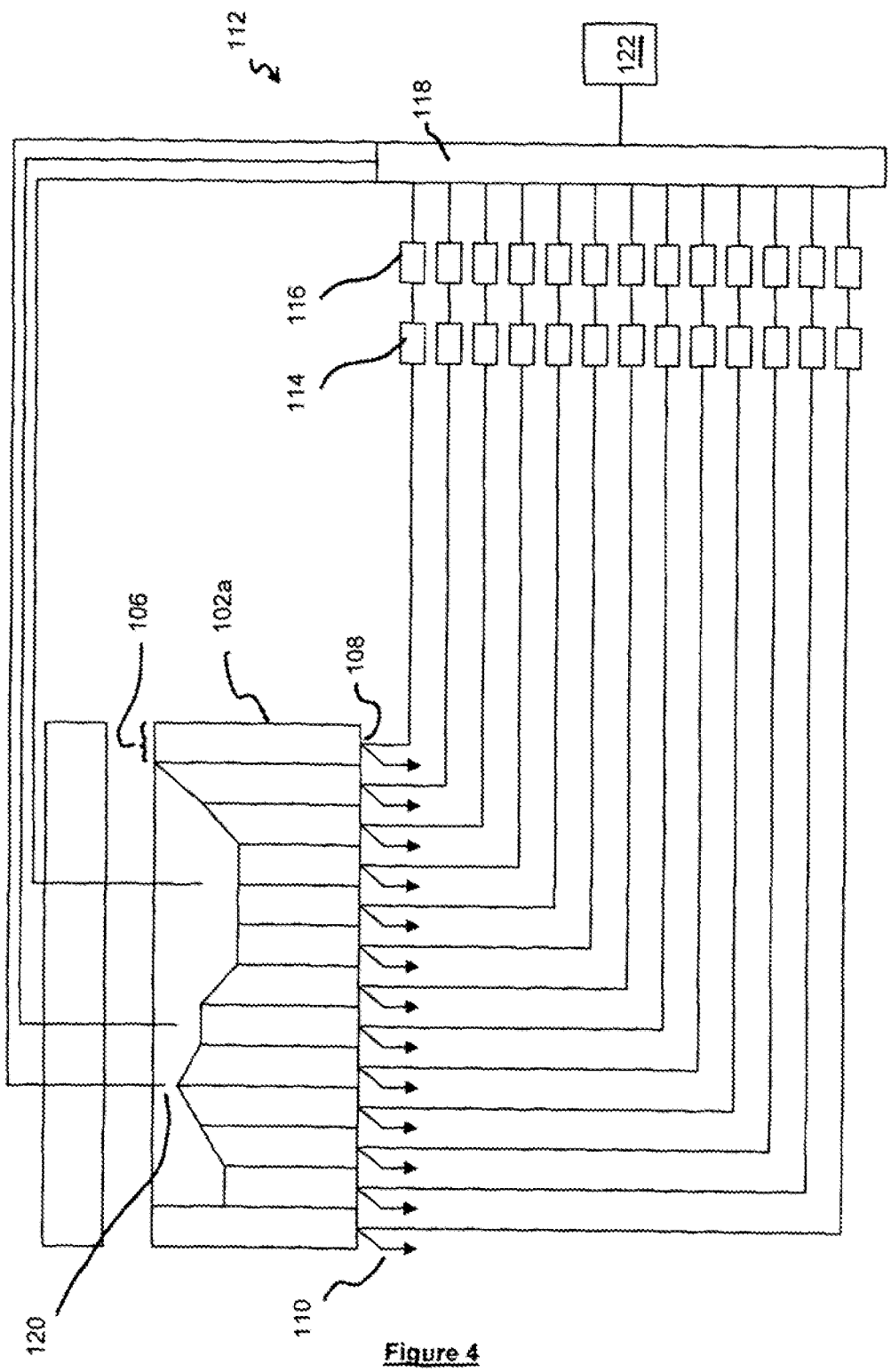
FIG. 4 shows a tool system in accordance with the invention.

Referring to FIG. 4 shows a tool system 112 is shown in accordance with the invention. Each tool zone 106 has an individual blown air heater 114 associated therewith. When operational the heaters 114 heat air which is than enters the pin 102a, via inlet 108, circulates in the pin, thereby heating/cooling the pin, and then exits via exits 110 and is vented to atmosphere. Each heater 114 has a local controller 116 associated therewith, which may be a PID controller or a similar controller, for controlling the heaters 114 to produce the required heat exchange with the article in the tool. A master controller 118 receives signals from sensors 120 in the tool which sense material properties of the article as it solidifies, and controls the local controllers in response to said received signals. The sensors may for example be dielectric sensors and, although some are omitted for clarity, sensors can be provided for every zone of the tool. The master controller 118 has a data input means 122 by which a user can input a required heating/cooling sequence for the tool zones 106. The data input means 122 may be an interactive means by which the user can directly input and save control commands and sequences or may simply comprise a data port/wireless receiver etc by which the controller can receive a machine readable control program generated externally from the tool system. By having separate heaters for each tool zone, in the event of a failure of one of the heaters the heat supplied by adjacent heated pins 102a can be modified to ensure that a satisfactory article is produced. As this enables the tool system to function, even in the event of component failure, efficiency may be increased as a result of reduced unplanned downtime as component failures can be made during normal tool down time.

Figure 5:
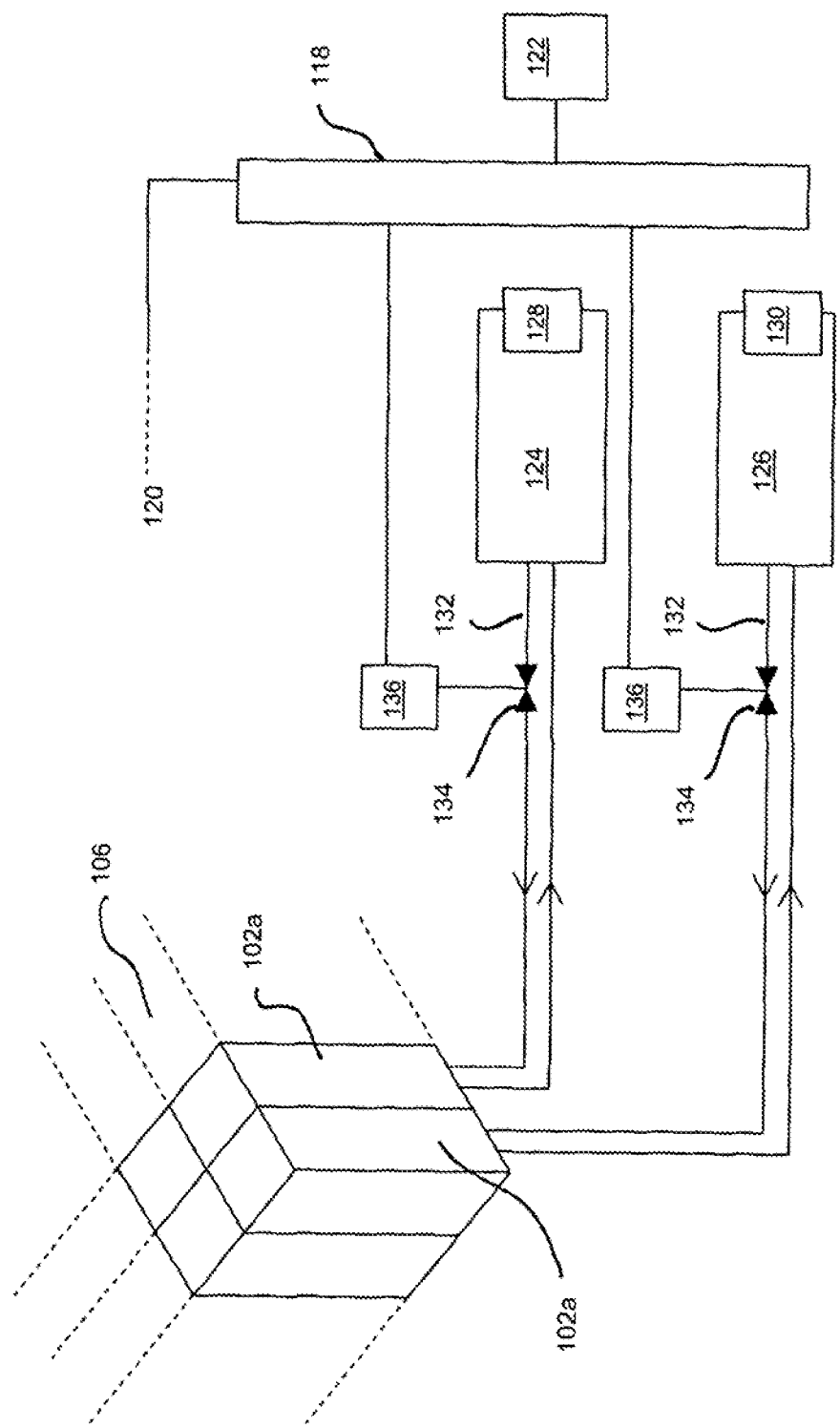
FIG. 5 shows an alternative tool system in accordance with the invention.

Referring to FIG. 5 an alternative tool system is shown. Each tool zone 106 has at least one heated/cooled pin 102a associated therewith. The heated/cooled pins 102a may be a single conunon pin or may, as shown, be two separate pins. The system comprises two reservoirs 124, 126, one of which is heated and the other is cooled by heating/cooling means 128, 130 and each reservoir is connected to a plurality of tool zones via valved conduits 132. The valves 134 are controlled by local controllers 136 which in turn are controlled by a master controller 118. Operation of the system is largely the same as that described above in that the master controller controls the local controllers dependant on signals received from sensors 120 (not shown). Return conduits return fluid from the heated/cooled pins to the reservoirs. In this way a closed loop heating and cooling system is used to increase the overall efficiency of the heating/cooling circuits. Furthermore a single reservoir can serve a number of, or all of, the tool zones.

Figure 10:
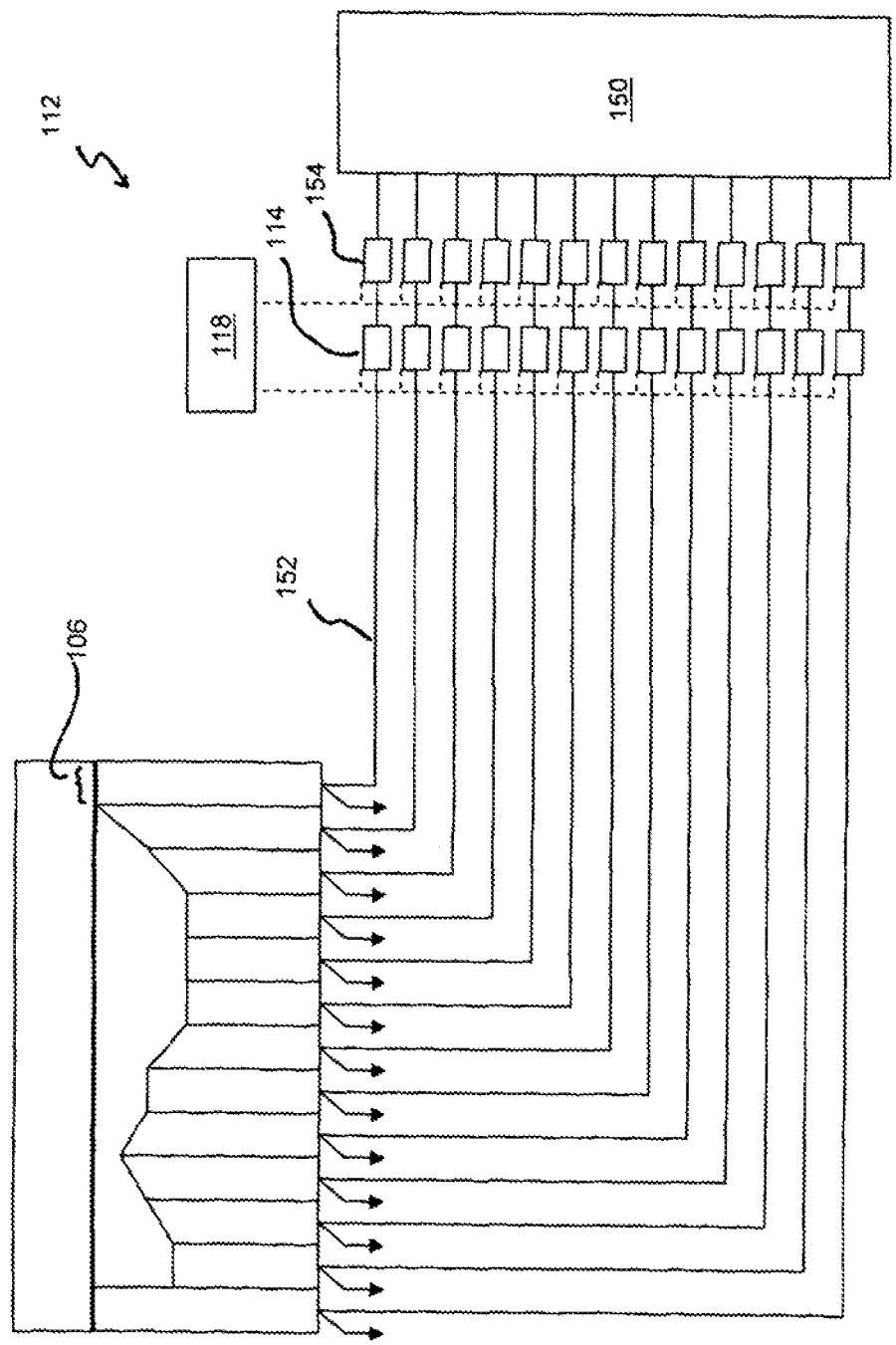
FIG. 10 shows a schematic diagram of an embodiment of tool system in accordance with the invention.

FIG. 10 shows a different arrangement wherein tool system is provided with a reservoir 150 of compressed fluid, preferably air, that supplies a plurality of conduits 152 that carry the fluid to the tool zones 106 of the tool system 112. Each conduit 152 has an inline heater 114 associated therewith that is controlled buy a controller 118. Although depicted as a single item the use of the word controller here is generic and it will be appreciated that the controller may include different levels of controller as described herein. Each conduit also has a flow control valve 154 associated therewith which may be a continuously variable valve or may have preset flow rates. The valve may for example be a tri state valve having a shut, a half open, and a fully open position.

The valves 154 are fail open valves so that in the event of a loss of power full flow is provided through the tool and the heaters are off, thereby cooling the tool and removing an residual or chemically produced heat. The heaters 114 may alternatively be placed in the fluid path within each tool zone, i.e. within the tool pins of a tool zone. Different heating and cooling fluids can be used dependant on the temperatures required. Heating fluids may include heated air, water and oil and cooling fluids may include cooled or ambient temperature air, water, water/glycol mixture and refrigerant gasses, for example the cooling circuit could be a traditional compression/expansion cooling circuit.

Figure 6:
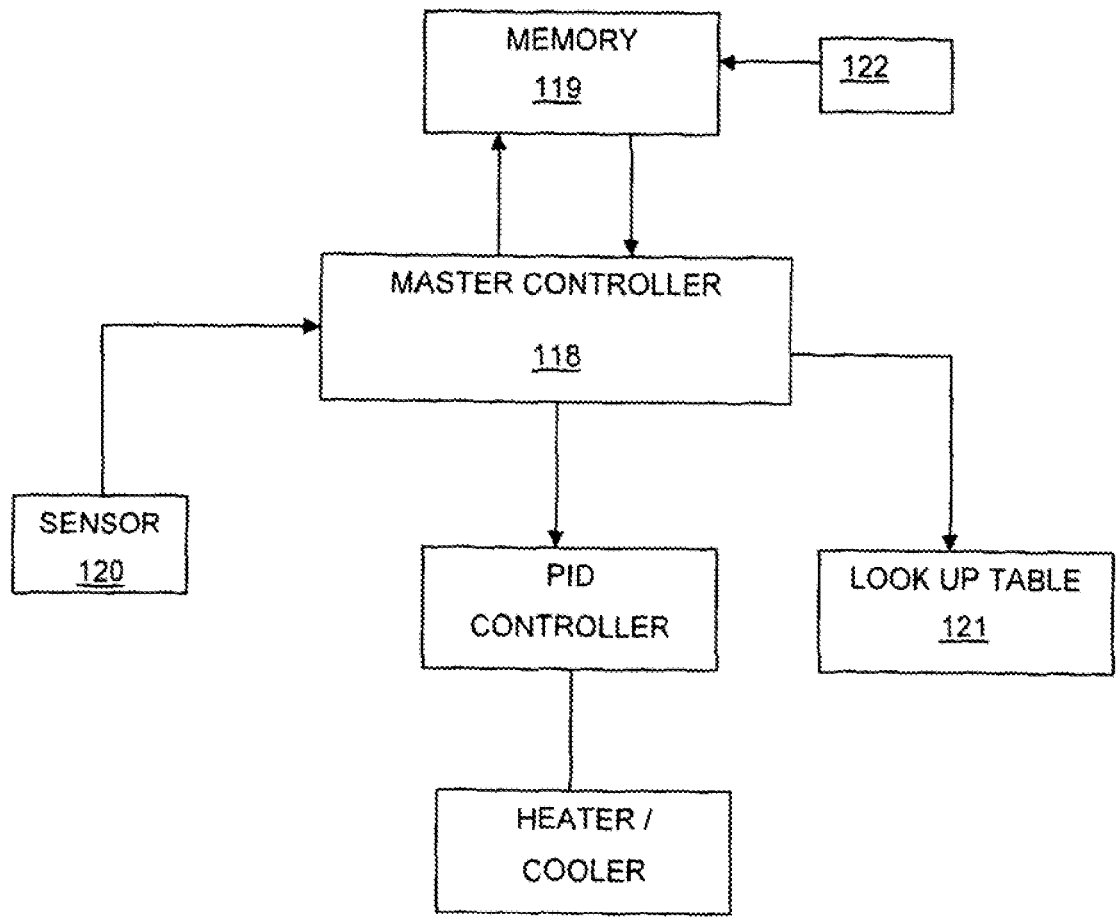
FIG. 6 shows a control system in accordance with the invention.

Referring to FIG. 6 a schematic diagram of the control of a tool system is shown. A Master controller 118 receives control signals from a memory 119 pertaining to the general control of the system. This may, for example, be a time against temperature plot for each tool zone detailed to give desired material characteristics in the finished article. The master controller 18 receives signals from at least one sensor 120 that is sensing, in real time, certain material properties of the article. There may for example be the article temperature, the article dielectric constant or the article density, the strain on the article or the absorption of energy, e.g. ultrasound, by the article.

There would usually be more than one sensor associated with the article, for example if different areas of the article need different final material properties then it is beneficial to have a sensor 120 associated with each area of different required material property. The received signals are stored in a database of historical data for future reference. The master controller 118 compares the current signal from the sensor to the required signal and can send an input signal to the local controller 116 to amend the temperature of the pin 102a associated therewith. In addition the master controller 118 can identify patterns in the incoming data and compare these to historical data stored by the master controller 118 in and can thus identify patterns in the heating/cooling for any particular article. Even in a controlled situation the heating and cooling of the article may vary from day to day as a function of the materials being used. For example in thermosetting resins the speed of the hardening of the resin will depend on the exact constitution, the ambient temperature, the amount of time it has been mixed prior to use etc. By comparing the trends for the current article to historical data the master controller 118 can identify early on if the article temperature is likely to go out of specific tolerances and can modify the figures in the look up table 121 that the local controller 114 uses to increase or reduce the heating profile for specific tool pins 102a.

Figure 7:
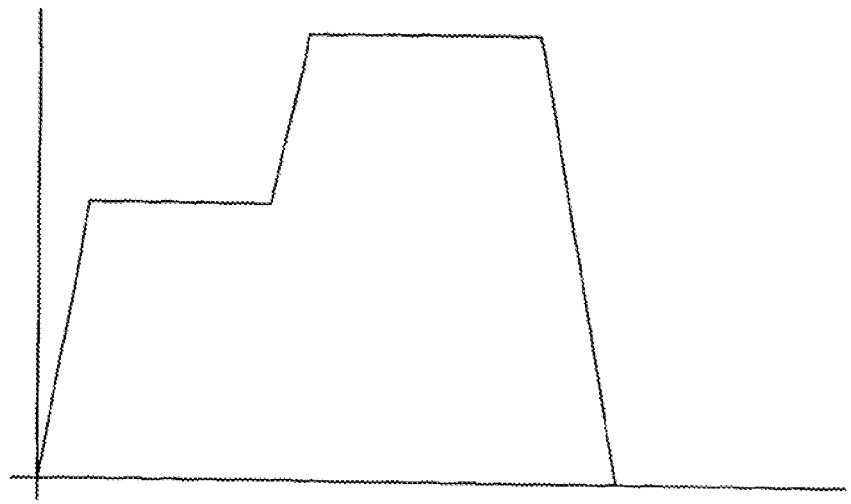
FIG. 7 shows a first temperature profile in accordance with the invention.

Referring to FIG. 7 a simple temperature profile is shown for moulding a thermosetting impregnated article blank. The tool pin temperature is first quickly raised to 85 degrees by passing heated fluid (for example water) through the tool pins of a tool 100 according to the invention. The temperature is then held at 85 degrees for 5 minutes in order for the blank impregnated with resin (a pre-preg) to consolidate. As the individual tool pins 102 in contact with the article or at least one tool pin 102a associated with a tool zone, is directly heated, heat can be quickly input into the article. After 5 minutes the temperature is once again raised, this time to 120 degrees in order for the polymer to cross link. After a predetermined time limit, or after a predetermined signal is received from a sensor, the tool pins are quickly cooled by passing a cooling fluid through the pin bodies. Once again, passing the cooling fluid directly through the tool pin 102a results in a quick temperature reduction and quickly cools the tool at the end of the process thereby minimising the cycle time. As the temperature has been carefully controlled through out the process, not only is a shorter time required, but consistent material properties are achieved in the finished article. As the tool has multiple zones each of which can be independently temperature controlled then each zone may have a profile and be controlled in the same manner as a single zone.

Figure 8:
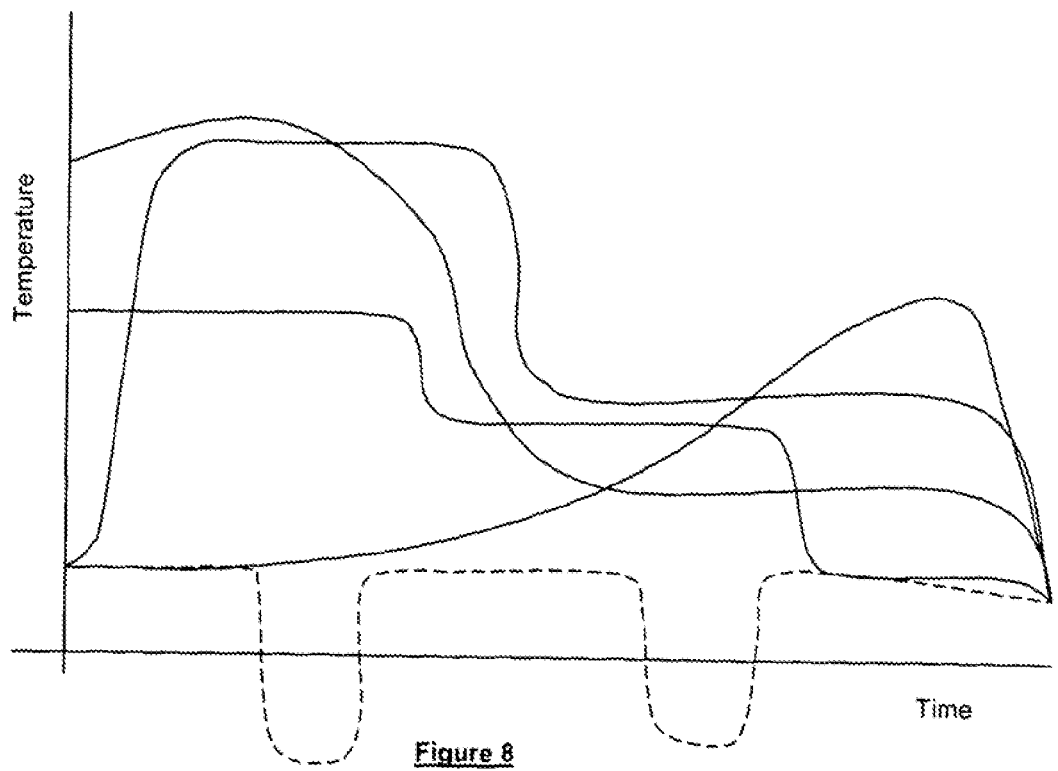
FIG. 8 shows a second temperature profile in accordance with the invention.

Referring to FIG. 8 a more complicated control profile is shown for a tool system having 5 tool zones, each tool zone requiring a different heating/cooling profile over time. The cooling means may include refrigerants to enable cooling of the tool pins below ambient temperature (see dotted line). One advantage of this is that specific areas of the article can be maintained at specific temperatures during the moulding process. For example if a moulding was being made with a specific insert that requires to be maintained below a specific temperature to prevent damage, e.g. a sensor or piece of electronics that will become and integral functional part of the article then the region of the article in which this insert is located can be maintained at a temperature that ensures the continued integrity of the sensor/electronics. Other parts of the article can be heated to a greater temperature to produce, for example, higher levels of cross linking in the polymer. Such control during moulding is not, for example, possible using an autoclave.

Figure 9:
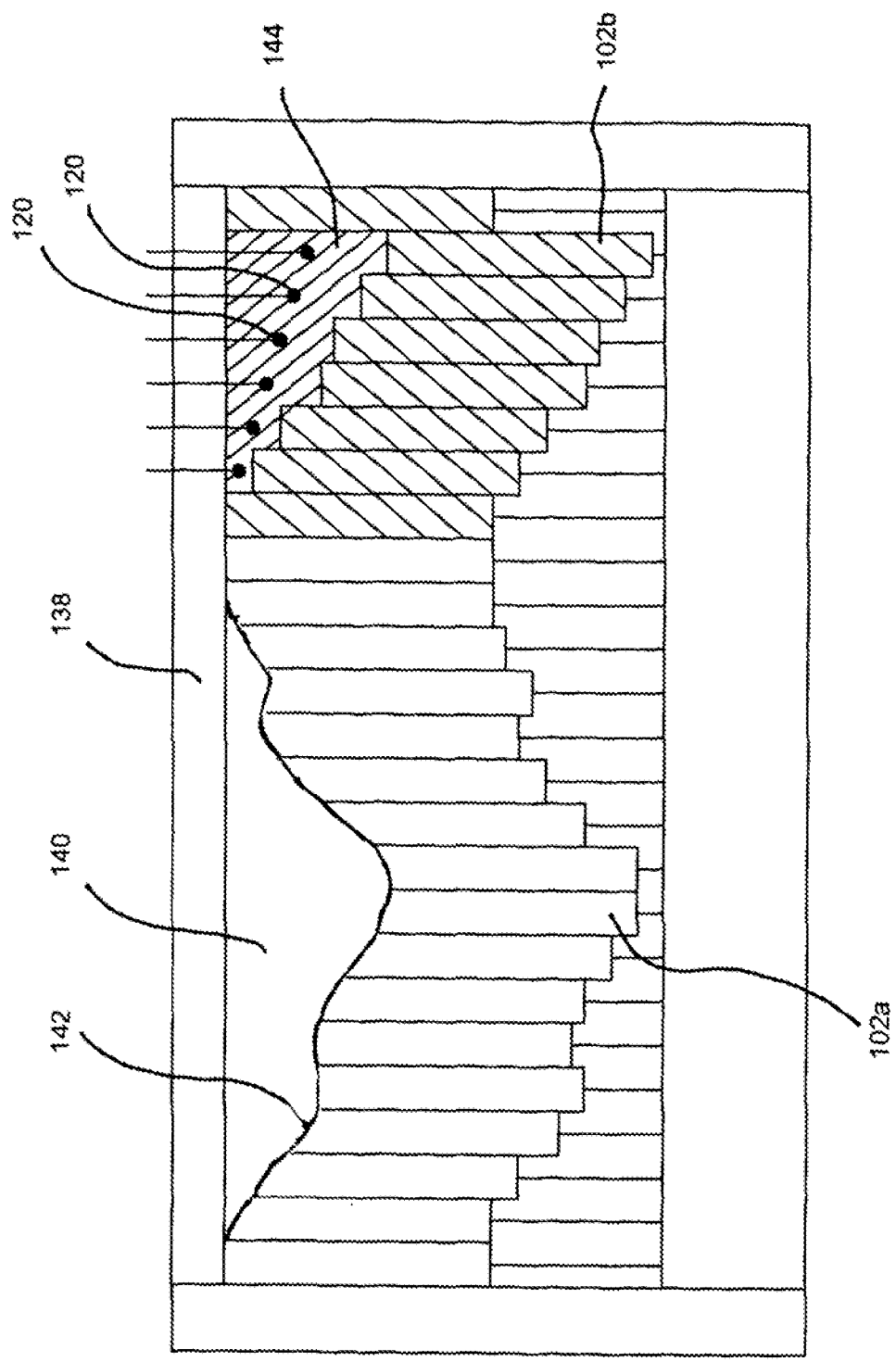
FIG. 9 shows a cross section through a tool of a system in accordance with the invention.

FIG. 9 shows a tool system having a plurality of heated tool pins 102a which come together with a tool upper plate 138 to form an article cavity 10. The pins 102a have a complex contoured surface 142. In a separate area of the tool a sensor cavity 144 is formed between a series of tool pins 102b and the tool upper plate 138. The tool pins 102b are arranged at regular heights and sensors 120 are located at predefined depths in the sensor cavity 144. During the moulding process material from the same batch as being used for the article is introduced into the sensor cavity 144 at the same time as it is introduced to the article cavity 140. The article material may, for example be a cross linked expanded polymer material. As the article material solidifies data collected from sensors 120 in the sensor cavity 14 is used to control the flow of heat to and from the pins 102a of the article cavity 140. Data from the sensors 120 is taken at a series of depths in the article material and is used to control heat to pills 102a that correspond to similar depths of article material in the article cavity. In this way real time data can be used from within the middle of the article material without the need to corrupt the integrity of the article as any sensors 120 that were placed within the actual article would remain there once the article had solidified. Once the process is finished the material from the sensor cavity 144 is discarded along with the sensors 120 therein. In extreme cases where very high levels of control are used a twin tool can be made wherein two identical article cavities are made alongside one another, both of which are controlled in an identical manner with heated tool pins 102a. One of the article cavities forms a sacrificial sensing article and the other article is the produced item. In this way the best possible replication of the internal conditions of the article are achieved. It will be appreciated however that where it is acceptable to have small foreign objects embedded in the finished part that the sensors may be embedded in the article material during the moulding process and be left in the article after the process is complete.

It will be appreciated that although the invention has been described in relation to a single tool face in many applications a tool with two tool faces will be used and that an upper tool face according to this invention may also be used in combination with a lower tool face to provide active heating and cooling from both sides of the tool.

The invention may be used with any suitable fluid and may include recycling the fluid (especially if a liquid) and/or heat recovery from the returning fluid.

The invention is described with reference to a tool comprising a plurality of tool pins, however it will be appreciated by the skilled person that although the tool pin construction is particularly advantageous in allowing modular construction, the tool could be made using a continuous tool surface and the heating/cooling achieved by attaching heating and cooling to the reverse tool surface and that accordingly the invention is not limited to tools of the pin type. Equally the joints of the pins may be welded together to provide a continuous tool surface. The tool surface may be finish machined after welding to machine it to final tolerance. Tooling system having only heated or only cooled pins are also within the scope of the invention and will be applicable to some situations and will deliver many of the benefits associated with heated and cooled tool pins.

The invention claimed is:

1. A tool system for moulding an article, the system comprising:
   a first tool having a tool surface for forming an article, the tool surface comprising a plurality of tool zones;
   a plurality of fluid flow paths configured to direct the flow of a heating/cooling fluid to each of the plurality of tool zones;
   a plurality of heating and cooling apparatuses, each independently associated with at least some of the plurality of tool zones, each of the plurality of heating and cooling apparatuses comprising an independent inline fluid heater; and
   a control system configured to:
      control the plurality of heating and cooling apparatuses to individually heat the tool zones by activating the inline fluid heater; and
      control the plurality of heating and cooling apparatuses to individually cool the plurality of tool zones;
      thereby regulating heat transfer into and out of the article at each tool zone at any time throughout the moulding of the article.

2. A tool system as claimed in claim 1, further comprising a plurality of sensors configured to sense a property of the article within the plurality of tool zones and to produce signals indicative of the property at each of the plurality of tool zones.

3. A tool system as claimed in claim 2, wherein the control system comprises an input configured to receive the signals indicative of the property and wherein the control system is configured to, based on the signals, control the plurality of heating and cooling apparatuses dependent on programmed criteria to heat or cool the plurality of tool zones.

4. A tool system according to claim 2, wherein the plurality of sensors are configured to sense at least one of: temperature, dielectric constant, ultrasonic absorption/transmission, strain and hardness.

5. A tool system according to claim 1, wherein the plurality of heating and cooling apparatuses define an internal channel in each of the plurality of tool zone below the surface of the first tool through which the heating/cooling fluid is passed and wherein the system further comprises at least one reservoir for the heating heating/cooling fluid.

6. A tool system according to claim 5, wherein the plurality of fluid flow paths are configured to direct the flow of the heating/cooling fluid from the at least one reservoir to individual ones of the plurality of tool zones.

7. A tool system according to claim 6, further defining return fluid flow paths to return the heating/cooling fluid from tool pins to the at least one reservoir.

8. A tool system according to claim 5, further comprising a plurality of the reservoirs, each of the plurality of reservoirs containing heating/cooling fluid maintained at a different temperature.

9. A tool system according to claim 6, each of the plurality of fluid flow paths comprising an inline heater therein configured to heat heating/cooling fluid passing therethrough.

10. A tool system according to claim 9, wherein a constant flow of heating/cooling fluid passes through the plurality of tool zones and wherein the inline heater is configured such that activation thereof changes the heating/cooling fluid from a cooling fluid to a heating fluid.

11. A tool system according to claim 1, wherein the plurality of tool zones comprises a plurality of active tool zones having heating and cooling apparatuses associated therewith, and a plurality of passive tool zones having no heating and cooling apparatuses associated therewith.

12. A tool system according to claim 11, wherein the plurality of passive tool zones are configured to be indirectly heated/cooled by heat transfer with adjacent one or ones of the plurality of active tool zones.

13. A tooling system according to claim 1, wherein the first tool comprises a plurality of tool pins that are configured to tessellate to form the tool surface and wherein at least some of the plurality of tool pins define fluid channels therein through which the heating/cooling fluid passes.

14. A tooling system according to claim 1, wherein the first tool comprises a plurality of tool pins that are configured to tessellate to form the tool surface and wherein at least some of the plurality of tool pins define fluid channels therein through which the heating/cooling fluid passes and comprise an internal in-line fluid heater for heating the heating/cooling fluid passing through the fluid channels thereof.

15. A tooling system according to claim 14, wherein the tool pins through which heating/cooling fluid passes comprise an insert that defines at least part of the fluid flow path.

16. A tooling system according to claim 6, further comprising a plurality of normally open control valves for controlling the flow of the heating/cooling fluid to the plurality of tool zones.

17. A tooling system according to claim 16, wherein the plurality of normally open valves are variable flow control valves.

18. A tooling system according to claim 1, further comprising a second tool arranged substantially opposite the first tool.

19. A tooling system according to claim 18, wherein the second tool is substantially the same as the first tool.

20. A method of manufacturing an article comprising:
providing a tool system comprising:
a tool having a tool surface for forming an article, the tool surface comprising a plurality of tool zones;
a plurality of fluid flow paths configured to direct flow of a heating/cooling fluid to each of the plurality of tool zones;
a plurality of heating and cooling apparatuses, each independently associated with at least some of the plurality of tool zones, each of the plurality of heating and cooling apparatuses comprising an inline fluid heater; and
a control system;
placing a material to be moulded in the tool;
using the control system to:
control the plurality of heating and cooling apparatuses to individually heat the plurality of tool zones by activating the inline fluid heaters; and
control the plurality of heating and cooling apparatuses to individually cool each of the plurality of tool zones;
thereby regulating heat transfer into and out of the article at each of the plurality of tool zones at any particular time throughout a process of manufacturing the article.

21. The method according to claim 20, further comprising:
sensing a property of the article at each of the plurality of tool zones, and
producing signals indicative of the sensed property at each of the plurality of tool zones.

22. A method according to claim 21, further comprising:
sensing the signals indicative of the property, and
controlling the heating and cooling apparatuses in response to the sensed signals to heat or cool the plurality of tool zones.

23. A method according to according to claim 21, wherein the sensed property is at least one of: temperature, dielectric constant and hardness.

24. A method according to claim 21, further comprising moulding a sacrificial piece of article material in a sensing section and wherein the sacrificial piece of article material in the sensing section comprises at least one sensor embedded therein.

25. A method according to claim 24, further comprising:
embedding several sensors within the sacrificial piece of article material at locations having different article material cross sectional areas, and
controlling the heating and cooling apparatuses of the plurality of tool zones at particular mould cross sectional areas in response to the signals produced by sensors at a corresponding cross sectional area.

26. A method according to claim 21, further comprising regulating the heat transfer into and out of the article to produce, within a predetermined tolerance, at least one article having a specific material property.

27. A method according to claim 26, wherein the at least one specific material property is configured to be individually controlled within specific ones of the plurality of tool zones.

28. A method according to claim 26, wherein the at least one specific material property is at least one of: density crystallinity/amorphicity, crystal size, cross-link ratio and vulcanization.

29. A method according to claim 21, further comprising:
providing a sensor for sensing a material property of the article material prior to commencement of a moulding process; and
supplying a signal indicative of the property to the controller prior to the commencement of the moulding process, and modifying control of the heating and cooling apparatuses during the moulding process in response to the material property sensed prior to commencement of the moulding process.

30. A method according to claim 21, wherein the article is manufactured by resin transfer moulding and wherein the method comprises sequentially heating the plurality of tool zones from the point of resin injection in a direction of resin flow so as to elevate a mould temperature as a leading edge of the resin flow passes thereover, thereby reducing a viscosity of the resin at a resin/perform interface as the resin flows into the tool.

31. A method according to claim 21, wherein at least one of the heating and cooling apparatuses are configured to be powered by different phases of a multiphase electricity supply and wherein the method comprises controlling a power supply to the heaters to substantially balance power usage across phases of the multiphase electricity supply such that a significantly unbalanced power draw is not placed on any one single phase of the multiphase electricity supply.

* * * * *